(12) United States Patent
Hayashino

(10) Patent No.: US 10,337,786 B2
(45) Date of Patent: Jul. 2, 2019

(54) VACUUM HEAT INSULATING BODY, AND HEAT INSULATING CONTAINER AND HEAT INSULATING WALL EMPLOYING SAME

(71) Applicant: Panasonic Intellectual Property Management Co., Ltd., Osaka-shi, Osaka (JP)

(72) Inventor: Yuki Hayashino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 157 days.

(21) Appl. No.: 15/314,693

(22) PCT Filed: Jun. 3, 2015

(86) PCT No.: PCT/JP2015/002812
§ 371 (c)(1),
(2) Date: Nov. 29, 2016

(87) PCT Pub. No.: WO2015/186358
PCT Pub. Date: Dec. 10, 2015

(65) Prior Publication Data
US 2017/0184338 A1   Jun. 29, 2017

(30) Foreign Application Priority Data
Jun. 4, 2014   (JP) .................................. 2014-115449

(51) Int. Cl.
*F25D 23/06*   (2006.01)
*B32B 5/18*   (2006.01)
(Continued)

(52) U.S. Cl.
CPC ................ *F25D 23/06* (2013.01); *B32B 3/02* (2013.01); *B32B 5/18* (2013.01); *B65D 81/38* (2013.01);
(Continued)

(58) Field of Classification Search
CPC . F25D 23/02; F25D 23/06; B32B 3/02; B32B 5/18; B65D 81/38; B65D 81/3813; B65D 81/3816; B65D 81/3825
See application file for complete search history.

(56) References Cited

U.S. PATENT DOCUMENTS

| 4,172,915 A | * | 10/1979 | Sheptak | .................. B32B 15/08 428/69 |
| 2003/0082357 A1 | * | 5/2003 | Gokay | ...................... B32B 3/04 428/212 |

(Continued)

FOREIGN PATENT DOCUMENTS

| JP | 58-145489 U | 9/1983 |
| JP | 9-145240 | 6/1997 |

(Continued)

OTHER PUBLICATIONS

Wikipedia entry for "Standard conditions for temperature and pressure", accessed Nov. 26, 2018.*

*Primary Examiner* — Walter Aughenbaugh
(74) *Attorney, Agent, or Firm* — Hamre, Schumann, Mueller & Larson, P.C.

(57) ABSTRACT

Air permeable core material is vacuum sealed in enveloping member. Further, core material is formed of at least two layers of heat insulating core materials having different heat conductivities. Further, at least two of the at least two layers of heat insulating core materials which form core material are formed of materials having change gradients in the heat conductivity changed in accordance with temperature, and the change gradients in the heat conductivity of the heat insulating core materials intersect with each other. Since two layers of heat insulating core materials having different heat conductivities are provided in a vacuum state, a heat insulating property becomes higher compared to a conventional configuration in which a single layer of the heat insulating
(Continued)

core material formed of fiber material such as glass wool or rock wool is vacuum sealed and the high heat insulating property is shown in a wide temperature range.

15 Claims, 6 Drawing Sheets

(51) Int. Cl.
    *B65D 81/38*     (2006.01)
    *B32B 3/02*     (2006.01)
    *F25D 23/02*     (2006.01)

(52) U.S. Cl.
    CPC ..... *B65D 81/3813* (2013.01); *B65D 81/3816* (2013.01); *B65D 81/3825* (2013.01); *F25D 23/02* (2013.01); *B32B 2266/06* (2013.01); *B32B 2375/00* (2013.01); *B32B 2439/00* (2013.01); *F25D 2201/122* (2013.01); *F25D 2201/124* (2013.01); *F25D 2201/1262* (2013.01); *F25D 2201/14* (2013.01)

(56) References Cited

U.S. PATENT DOCUMENTS

| | | |
|---|---|---|
| 2013/0305928 A1 | 11/2013 | Kojima et al. |
| 2013/0306655 A1 | 11/2013 | Takushima et al. |

FOREIGN PATENT DOCUMENTS

| | | |
|---|---|---|
| JP | 2007-239771 | 9/2007 |
| JP | 2010-242875 | 10/2010 |
| JP | 2010-249174 | 11/2010 |
| JP | 2011-149501 | 8/2011 |
| JP | 2013-053822 | 3/2013 |

* cited by examiner

VACUUM HEAT INSULATING BODY, AND HEAT INSULATING CONTAINER AND HEAT INSULATING WALL EMPLOYING SAME

TECHNICAL FIELD

The present invention relates to a vacuum heat insulating body, a heat insulating container, and a heat insulating wall employing the same.

BACKGROUND ART

In recent years, from the viewpoint of prevention of global warming, energy saving is strongly demanded, and the energy saving is an urgent problem in electric household appliances. Especially, in a refrigerator, a freezer, or a warm and cold storage such as a vending machine, a heat insulating material having an excellent heat insulating property is desired from the viewpoint of efficient use of heat.

As a general heat insulating material, fiber material such as glass wool or foamed body such as urethane foam is used. However, to enhance the heat insulating property of these heat insulating materials, it is necessary to increase a thickness of the heat insulator, and in a case where the size of the space to which the heat insulating material is filled is limited and therefore the space saving or effective use of the space is needed, the heat insulating material cannot be adopted.

Accordingly, a vacuum heat insulating material is proposed as a heat insulating material with high performance. The vacuum heat insulating material is a heat insulating body in which a core material having a function as a spacer is inserted into an enveloping member having a gas barrier property and sealed after evacuating the inside.

The vacuum heat insulating material has a heat insulating property that is about 20 times as efficient as the heat insulating property of urethane foam. Thus, the vacuum heat insulating material has such excellent characteristics that even when the thickness of the vacuum heat insulating material is reduced, sufficient heat insulating property can be obtained.

Accordingly, the vacuum heat insulating material satisfies customer needs to increase an inner volume of a heat insulating box. Moreover, the vacuum heat insulating material attracts attention as an effective member for saving energy by improving the heat insulating property.

Further, in the refrigerator or the like, by additionally disposing the vacuum heat insulating material between an inner box and an outer box of the heat insulating box which forms a refrigerator body and further filling with foamed urethane foam, the heat insulating property is enhanced and an inner volume of the heat insulating box is enlarged (for example, see PTL 1).

Further recently, the vacuum heat insulating material is considered for use in a freezing container which needs to store objects at a temperature lower than that of the refrigerator, or a tank for liquefied natural gas (LNG) or the like which needs to store objects at an ultra-low temperature further lower than that of the freezing container (for example, see PTL 2).

When the vacuum heat insulating body is adopted in the freezing container, the energy saving can be enhanced due to its high heat insulating property. Further, when the vacuum heat insulating body is adopted in a heat insulating container such as an LNG tank, heat invasion into the heat insulating container can be suppressed efficiently, and therefore generation of boil off gas (BOG) can be reduced.

However, since a cold storage temperature of the freezing container is approximately in a range from −60° C. to −25° C. and the temperature of LNG is the ultra-low temperature of −162° C., the vacuum heat insulating body having a heat insulating property as high as possible is required, and therefore it is desired to further improve the heat insulating property.

The present invention has been made in view of such circumstances, and an object thereof is to improve a heat insulating property of a vacuum heat insulating body which forms a heat insulating container or the like.

CITATION LIST

Patent Literature

PTL 1: Unexamined Japanese Patent Publication No. 2013-53822
PTL 2: Unexamined Japanese Patent Publication No. 2010-249174

SUMMARY OF THE INVENTION

According to the present invention, a vacuum heat insulating body includes: a core material having air permeability; and an enveloping member which vacuum seals the core material, wherein the core material is formed of at least two layers of heat insulating core materials having different heat conductivities, at least two of the at least two layers of the heat insulating core materials which form the core material are made of materials having change gradients in the heat conductivity changed in accordance with temperature, and the change gradients in the heat conductivity of the heat insulating core materials intersect with each other.

With this configuration, the vacuum heat insulating body has two layers of the heat insulating core materials having different heat conductivities in a vacuum state, and the heat insulating property becomes higher in a wide temperature range compared to a conventional configuration in which a single layer of the heat insulating core material made only of fiber material such as glass wool or rock wool is vacuum sealed, and therefore a high heat insulating property can be obtained even in an ultra-low temperature range. Thus, the vacuum heat insulating material capable of insulating heat efficiently in a wide temperature range, from a refrigerator to a heat insulating container which holds an ultra-low temperature object such as LNG or hydrogen gas, can be provided. Furthermore, the thickness of a wall of a heat insulating structure formed by employing the vacuum heat insulating body can be reduced because the heat insulating property is improved.

First, knowledge of the inventors who reached such an invention is described.

The present inventors have carried out a study of changing and combining kinds of the core materials, a degree of vacuum, and the enveloping member in order to improve the heat insulating property of the heat insulating body. As a result, the following knowledge was obtained.

That is, it was understood that, when foam resin, for example, open cell urethane foam, is used as the core material instead of closed cell urethane foam and vacuum sealed, heat conductivity is decreased (the heat insulating property is improved) compared to that of closed cell urethane foam used in the atmospheric pressure. Next, at least two kinds of the heat insulating core materials having different heat conductivities are charged and vacuum sealed in the enveloping member. Materials of the two kinds of the heat insulating core materials have change gradients in heat conductivity changed in accordance with change in temperature, and the change gradients in the heat conductivity of the heat insulating core materials intersect with each other in accordance with change of an average temperature of an object to be heat insulated. According to a combination of the materials, it was understood that the heat insulating property in the low temperature range is improved.

The present invention is completed based on such knowledge, and as described above, the vacuum heat insulating body is formed by vacuum sealing at least two layers of the heat insulating core materials having different heat conductivities in the enveloping member. Further, the vacuum heat insulating body has two layers of the heat insulating core materials having different heat conductivities in a vacuum state, and therefore the vacuum heat insulating body has a high heat insulating property in a wider temperature range compared to the conventional configuration in which a single layer of the heat insulating core material made of fiber material such as glass wool or rock wool is vacuum sealed. Of particular note is that the vacuum heat insulating body has the high heat insulating property in the ultra-low temperature range, and the thickness of the wall of the heat insulating structure formed by employing the vacuum heat insulating body can be reduced because the heat insulating property is improved. Therefore, it provides an effective technique of providing the heat insulating body such as those used in the heat insulating container which holds an ultra-low temperature substance such as LNG or hydrogen gas.

DESCRIPTION OF EMBODIMENTS

Hereinafter, exemplary embodiments of the present invention will be described with reference to the drawings. Note that the present invention is not limited to the exemplary embodiments.

First Exemplary Embodiment

Figure 1:
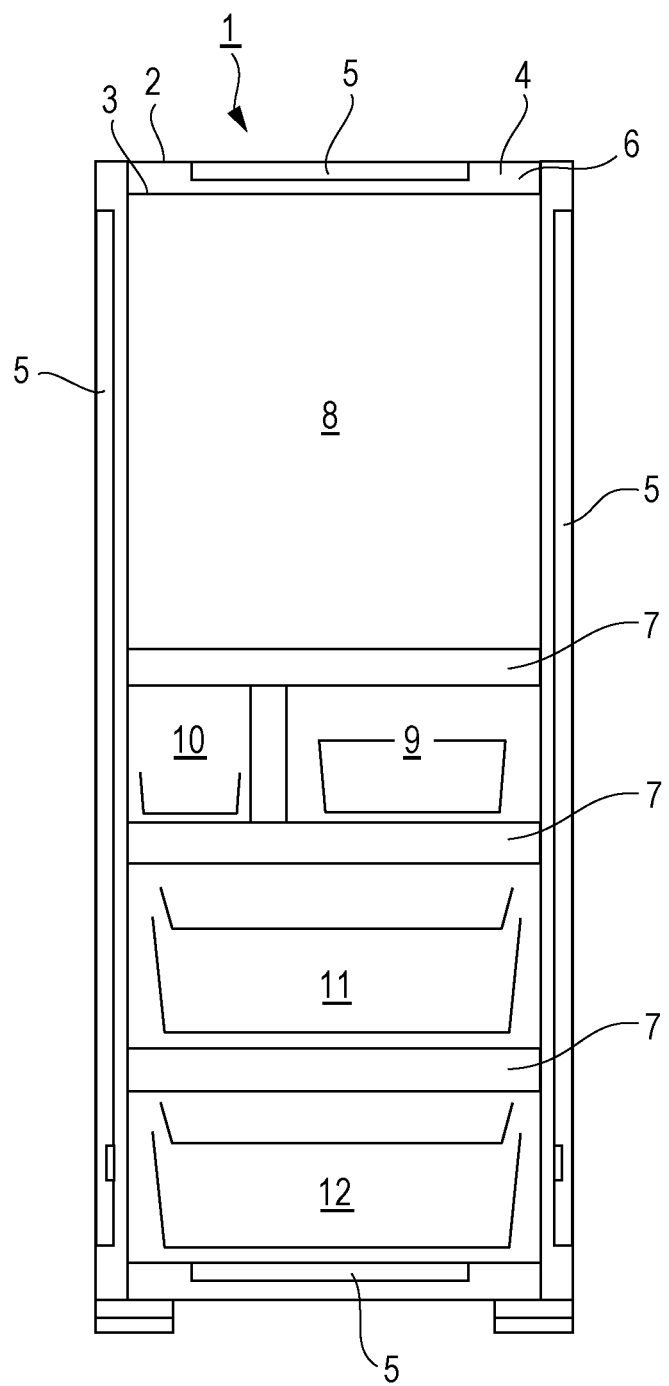
FIG. 1 is a cross-sectional view of a refrigerator employing a vacuum heat insulating body according to a first exemplary embodiment of the present invention.
Figure 2:
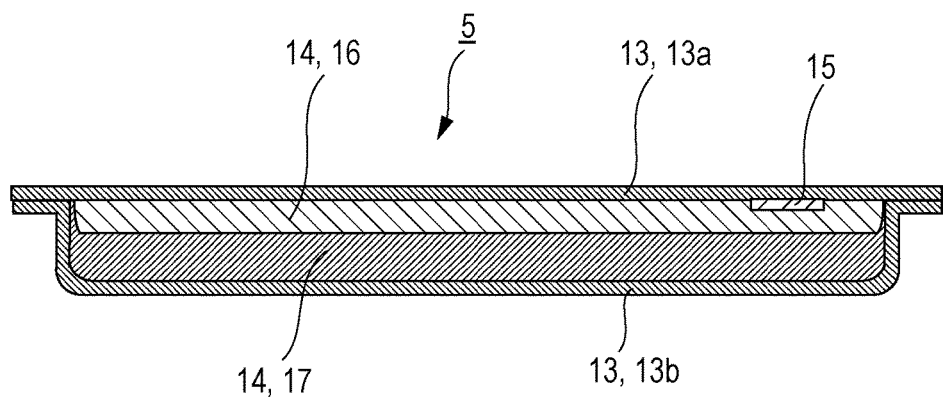
FIG. 2 is an enlarged cross-sectional view of the vacuum heat insulating body according to the first exemplary embodiment of the present invention.

FIG. 1 is a cross-sectional view of a refrigerator employing a vacuum heat insulating body according to a first exemplary embodiment of the present invention, and FIG. 2 is an enlarged cross-sectional view of the vacuum heat insulating body according to the first exemplary embodiment of the present invention.

Configuration of Refrigerator

First, a configuration of a refrigerator will be described.

In FIG. 1, the refrigerator according to the present exemplary embodiment has heat insulating box 1 provided with outer box 2 made of metal (for example, steel), and inner box 3 made of hard resin (for example, ABS resin). Further, after vacuum heat insulating body 5 is disposed in heat insulating space 4 formed by outer box 2 and inner box 3 of heat insulating box 1, heat insulating foam 6 made of hard urethane foam is formed by filling heat insulating space 4 with hard urethane material and foaming.

The inner space of heat insulating box 1 is partitioned by partition plates 7 into refrigerating chamber 8, upper freezing chamber 9, ice-making chamber 10, lower freezing chamber 11, and vegetable chamber 12, and each chamber has a door (not shown). The doors are configured according to heat insulating box 1. Although not shown, the refrigerator has members (a compressor, an evaporator, a condenser or the like) based on a refrigerating principle.

Configuration of Vacuum Heat Insulating Body

Next, a configuration of vacuum heat insulating body 5 disposed in heat insulating space 4 will be described with reference to FIG. 2.

As shown in FIG. 2, vacuum heat insulating body 5 is formed by vacuum sealing air permeable core material 14 and gas adsorption agent 15 in enveloping member 13. Here, vacuum sealing includes a state where pressure of the heat insulating space is reduced to be lower than the atmospheric pressure.

Enveloping member 13 is formed by welding outer peripheral parts of flat thin plate 13a and thin recessed plate 13b made of metal such as stainless, aluminum, or steel having a thickness of 1.5 mm or gas non-permeable resin having a high gas barrier property such as ethylene-vinyl alcohol copolymer resin (EVOH), and enveloping member 13 itself has rigidity.

Further, core material 14 vacuum sealed in enveloping member 13 is formed of two layers: a first heat insulating core material 16, which has heat conductivity greatly changed in accordance with temperature, and a second heat insulating core material 17, which has heat conductivity hardly changed in accordance with temperature. Further, the first heat insulating core material 16 and the second heat insulating core material 17 are made of materials in which change gradients in the heat conductivities intersect with each other.

For example, in the present exemplary embodiment, the first heat insulating core material 16 is formed of open cell resin, and the second heat insulating core material 17 is formed of fiber material.

The open cell resin which forms the first heat insulating core material 16 is formed of open cell urethane foam disclosed in Japanese Patent No. 5,310,928 by the present applicant, and although the detailed structure thereof is omitted by incorporating the description of PTL 1 by reference herein, it will be described briefly as below.

That is, the open cell resin is formed by, for example, a copolymerization reaction of open cell urethane foam integrally foamed and filled in the heat insulating space. Many cells in a core layer at a center part of the heat insulating space are communicated with a first penetration hole, and cells in a skin layer adjacent to a boundary surface between a case forming the heat insulating space are communicated with a second penetration hole formed of powders having a low hydrophilic property with the urethane resin. Further, the open cell resin is formed in such way that cells in all of the region between the core layer and the skin layer are communicated with the first penetration hole and the second penetration hole.

In the open cell resin, for example, the open cell urethane foam, having such a structure described above, a surface area inside the open cell urethane foam becomes larger as its porosity becomes higher. Since heat from outside is transmitted along the surface of the open cell urethane foam, the heat insulating property is improved as its surface area becomes larger. Thus, by using the open cell resin disclosed in Japanese Patent No. 5,310,928, a closed cell remaining in the skin layer adjacent to an inner surface of a box is changed into an open cell and the surface area becomes larger, and therefore an open cell urethane foam with better heat insulating property than that of a general closed cell urethane foam can be obtained.

The open cell resin which forms the first heat insulating core material 16 holds the shape of vacuum heat insulating body 5 (contributes to strength and rigidity of the vacuum heat insulating body) by supporting the enveloping member 13 of the vacuum heat insulating body 5. Thus when the porosity of the open cell resin becomes high, the heat insulating property of the open cell resin is improved, but a shape holding property is deteriorated. To prevent this deterioration, the porosity of the open cell resin should be determined by taking the heat insulating property and mechanical strength into consideration. In the present exemplary embodiment, a size of the cell is in a range from 30 μm to 200 μm, and the porosity is 95% or more.

The second heat insulating core material 17 is formed of fiber material, and inorganic fiber material is adopted to improve a flame retardant property. Specifically, examples of the inorganic fiber material include glass wool fiber, ceramic fiber, slag wool fiber, rock wool fiber or the like, and in the present exemplary embodiment, glass wool fiber having an average fiber diameter in a range from 4 μm to 10 μm (glass fiber having a relatively large fiber diameter) is adopted, and is used after being baked.

Further, the fiber material which forms the second heat insulating core material 17 is sealed in an air permeable enveloping member (not shown) and formed into a shape along heat insulating space 4. The shape along heat insulating space 4 can be formed easily by mixing binder material into the fiber material, however in such a case, a ratio of the fiber material is set to be at least in a range from 5% to 90%.

In vacuum heat insulating body 5 formed as described above, the first heat insulating core material 16 is disposed so as to face an inner space which forms refrigerating chamber 8 or the like of heat insulating box 1, and the second heat insulating core material 17 is disposed so as to face an outer side.

Effects of Vacuum Heat Insulating Body

Next, effects of vacuum heat insulating body 5 will be described.

Vacuum heat insulating body 5 is formed such that core material 14 has a two-layer structure of the first heat insulating core material 16 formed of the open cell resin and the second heat insulating core material 17 formed of a fiber core material such as conventionally used glass wool or rock wool. Thus, the heat insulating property is higher in a wide temperature range, particularly in a low temperature range, compared to a configuration in which a single-layer core material made only of fiber material such as the conventionally used glass wool or rock wool is vacuum sealed.

That is, as described above as the knowledge obtained by the inventors, when a resin foam, for example an open cell urethane foam, is used as the core material instead of a closed cell urethane foam and vacuum sealed, heat conductivity $\lambda$ decreases as degree of vacuum Pa becomes higher and therefore the heat insulating property is improved. This is because the heat insulation by air in the cells before the core material is vacuum sealed is changed to heat insulation by vacuum, and the heat conductivity is decreased due to the increase in the degree of vacuum. Further, in addition to the vacuum heat insulation effect, as already described above, the inner cell surface area is increased (i.e. heat conductive area is increased) by adopting the open cell resin, and this configuration leads to the decrease of the heat conductivity, and therefore the heat insulating property is improved.

Figure 3:
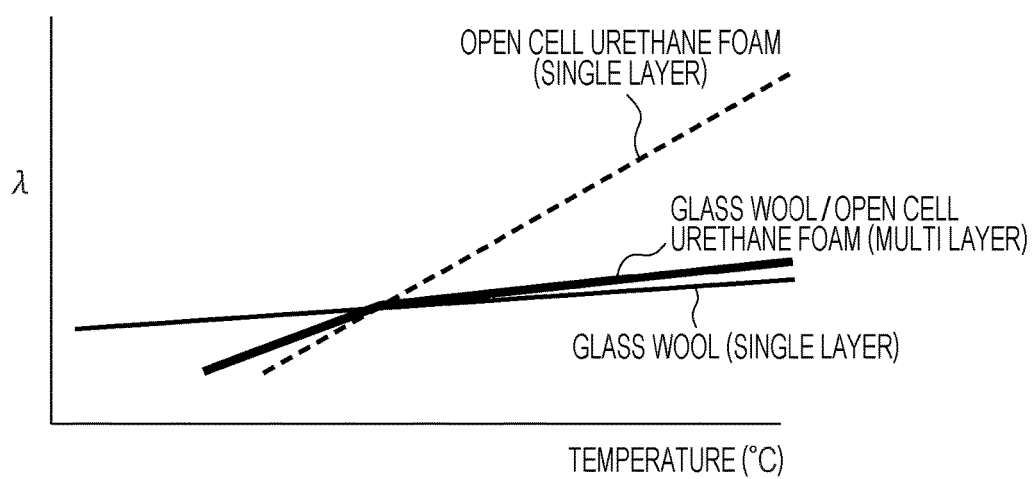
FIG. 3 is a graph illustrating a relationship between temperature of a core material and heat conductivity of the vacuum heat insulating body according to the first exemplary embodiment of the present invention.

FIG. 3 illustrates a relationship between temperature ° C. and heat conductivity $\lambda$ of glass wool and open cell urethane foam. As shown in FIG. 3, heat conductivity $\lambda$ of a single layer of the glass wool is hardly changed when temperature ° C. is changed, whereas heat conductivity $\lambda$ of a single layer of the open cell urethane foam is greatly changed, and the change gradients in the heat conductivity of both of the glass wool and the open cell urethane foam are different from each other. Further, the change gradient in the heat conductivity of the single layer of the open cell urethane foam intersect with the change gradient in the heat conductivity of the single layer of the glass wool, and heat conductivity $\lambda$ of the single layer of the open cell urethane foam becomes lower than heat conductivity $\lambda$ of the single layer of the glass wool as temperature ° C. becomes low. Further, in the ultra-low temperature range, such as −162° C. heat conductivity $\lambda$ of the single layer of the open cell urethane foam, which has a larger change gradient in the heat conductivity, becomes lower, and presents higher heat insulating property. Further, needless to say, in the single layer of the open cell urethane foam, heat conductivity $\lambda$ becomes smaller as degree of vacuum Pa becomes higher, and the heat insulating property is further improved.

Therefore, heat conductivity $\lambda$ of the single layer of the open cell urethane foam becomes lower than that of the single layer of the glass wool as temperature ° C. becomes low, and in the ultra-low temperature range, the single layer of the open cell urethane foam having the larger change gradient in the heat conductivity shows superior heat insulating property. Therefore, the heat conductivity of glass wool/open cell urethane foam (multi layer) becomes as shown in FIG. 3.

Accordingly, the vacuum heat insulating material can be formed for insulating heat efficiently in a wide temperature range from a refrigerator to a heat insulating container which holds an ultra-low temperature substance such as LNG or hydrogen gas.

Further, since the heat insulating property is improved, the thickness of the wall of the heat insulating structure formed by using the vacuum heat insulating body can be reduced, and therefore an inner volume of the refrigerator, the freezer, the LNG tank or the like can be enlarged.

Further, in vacuum heat insulating body 5 according to the present embodiment, the second heat insulating core material 17 of the heat insulating core materials forming core material 14, which is made of fiber material or powder material, is formed by first charging the material into an air permeable bag, placing in enveloping member 13, and then filling and foaming with open cell urethane foam. This way, second heat insulating core material 17, which is made of a fiber material or the powder material which are flexible and can lose its shape easily, can be charged in enveloping member 13 with ease, leading to efficient production and reduction of costs.

Further, since gas adsorption agent 15 is vacuum sealed in vacuum heat insulating body 5 together with core material 14, the gas remaining in first heat insulating core material 16 or second heat insulating core material 17, or the gas included in the open cell resin which forms first heat insulating core material 16 and gradually discharged from the open cell resin is adsorbed by gas adsorption agent 15. As a result, increase in inner pressure due to the gas is reliably suppressed, and therefore the deformation of the vacuum heat insulating body 5 can be prevented, and at the same time its heat insulating property can be favorably maintained for a long period of time.

In particular, in the present embodiment, since gas adsorption agent 15 is disposed at a side of the open cell resin which forms first heat insulating core material 16, the gas discharged from the open cell resin in accordance with a lapse of time can be adsorbed efficiently via an open cell passage, and therefore the increase in the inner pressure can be prevented efficiently and deterioration of the heat insulating property can be suppressed efficiently.

Note that, gas adsorption agent 15 absorbs mixture gas such as water vapor, or air remaining in or entering a sealed space such as heat insulating space 4 described above. Examples of gas adsorption agent 15 include, but is not limited to, a chemical adsorption substance such as calcium oxide or magnesium oxide, a physical adsorption substance such as zeolite, and a mixture thereof. Further, copper ion-exchanged ZSM-5 type zeolite having an adsorption property of both the chemical adsorption property and the physical adsorption property and having large adsorption capacity can be also used.

In the present exemplary embodiment, an adsorption material including the copper ion-exchanged ZSM-5 type zeolite is used. Even if the open cell resin apt to continue to discharge gas in accordance with the lapse of time is used as a core material, gas adsorption is continued reliably for a long period of time by the copper ion-exchanged ZSM-5 type zeolite having the high adsorption property and the large adsorption capacity, and therefore the increase in the inner pressure can be prevented and the deterioration of the heat insulating property can be suppressed reliably in heat insulating box 1 for a long period of time.

Further, since the fiber material which forms second heat insulating core material 17 is provided as the inorganic fiber material such as glass wool or rock wool, an amount of water generated therefrom can be maintained at a lower level and the heat insulating property can be favorably maintained. That is, since the inorganic fiber material has a low water absorption property (hygroscopicity), the amount of water inside heat insulating box 1 can be maintained at the lower level. Accordingly, deterioration of the adsorption property of gas adsorption agent 15 due to adsorption of water can be suppressed, the gas adsorption property of gas adsorption agent 15 is favorably maintained, and therefore the heat insulating property can be favorably maintained.

Further, since the inorganic fiber material is baked, even if heat insulating box 1 is broken for some reason, the inorganic fiber material does not greatly expand and therefore the shape of heat insulating box 1 is maintained. For example, in a case where the inorganic fiber material is vacuum sealed without being baked, although it depends on various conditions, the size of inorganic fiber material when heat insulating box 1 is broken may expand to 2 to 3 times as large as the original size, however by baking the inorganic fiber material, the size of inorganic fiber material when heat insulating box 1 is broken can be suppressed to less than 1.5 times of the original size, and therefore a shape retaining property can be enhanced.

In heat insulating box 1 formed as described above, the first heat insulating core material 16 is disposed so as to face the inner space of the heat insulating box, or to face toward the inner space which forms refrigerating chamber 8 or the like. This way, efficient heat insulation can be achieved and the high heat insulating property can be obtained. That is because heat conductivity $\lambda$ of the open cell resin which forms vacuum sealed first heat insulating core material 16 is lower than that of glass wool, rock wool or the like which forms similarly vacuum sealed second heat insulating core material 17. Thus, with an arrangement described above, the first heat insulating core material 16 having low heat conductivity $\lambda$ efficiently insulates heat at a lower temperature, and then the second heat insulating core material 17 located outside of the first heat insulating core material 16 insulates heat at a higher temperature. Therefore, the second heat insulating core material 17 having slightly higher heat conductivity $\lambda$ can efficiently insulate heat at its appropriate location and cold temperature in the vacuum heat insulating box can be retained and held efficiently by the combination of heat insulating properties.

According to the above description, core material 14 which forms the vacuum heat insulating body 5 has the two layer structure of the first heat insulating core material 16 formed of the open cell resin and the second heat insulating core material 17 formed of the fiber core material such as glass wool or rock wool. In another configuration, the first heat insulating core material 16 formed of an organic heat insulating material and the second heat insulating core material 17 formed of an inorganic heat insulating material may be adopted. In even another configuration, a configuration in which the magnitude of heat conductivity $\lambda$ of the first heat insulating core material 16 and the magnitude of heat conductivity $\lambda$ of the second heat insulating core material 17 are switched at a positive temperature range and a negative temperature range may be adopted. That means that heat conductivity $\lambda$ of first heat insulating core material 16 formed of the organic heat insulating material and heat conductivity $\lambda$ of second heat insulating core material 17 formed of the inorganic heat insulating material intersect at a certain temperature (generally in the negative temperature range). Further, an example of the organic heat insulating material includes open cell urethane foam, and an example of the inorganic heat insulating material includes glass wool.

In the positive temperature range, heat conductivity λ of the organic heat insulating material is larger than heat conductivity λ of the inorganic heat insulating material, and in the negative temperature range, heat conductivity λ of the inorganic heat insulating material is larger than heat conductivity λ of the organic heat insulating material.

With this configuration, the vacuum heat insulating body can be applied when a temperature difference between a high temperature side and a low temperature side is large. For example, the vacuum heat insulating body is optimally used for an ultra-low temperature type freezer or a cryogenic freezer in which the temperature difference between an environment temperature (room temperature) and a chamber internal temperature (below −100° C.) is large.

Second Exemplary Embodiment

In a second exemplary embodiment of the present invention, a heat insulating box of a refrigerator itself is formed as a vacuum heat insulating body.

Figure 4:
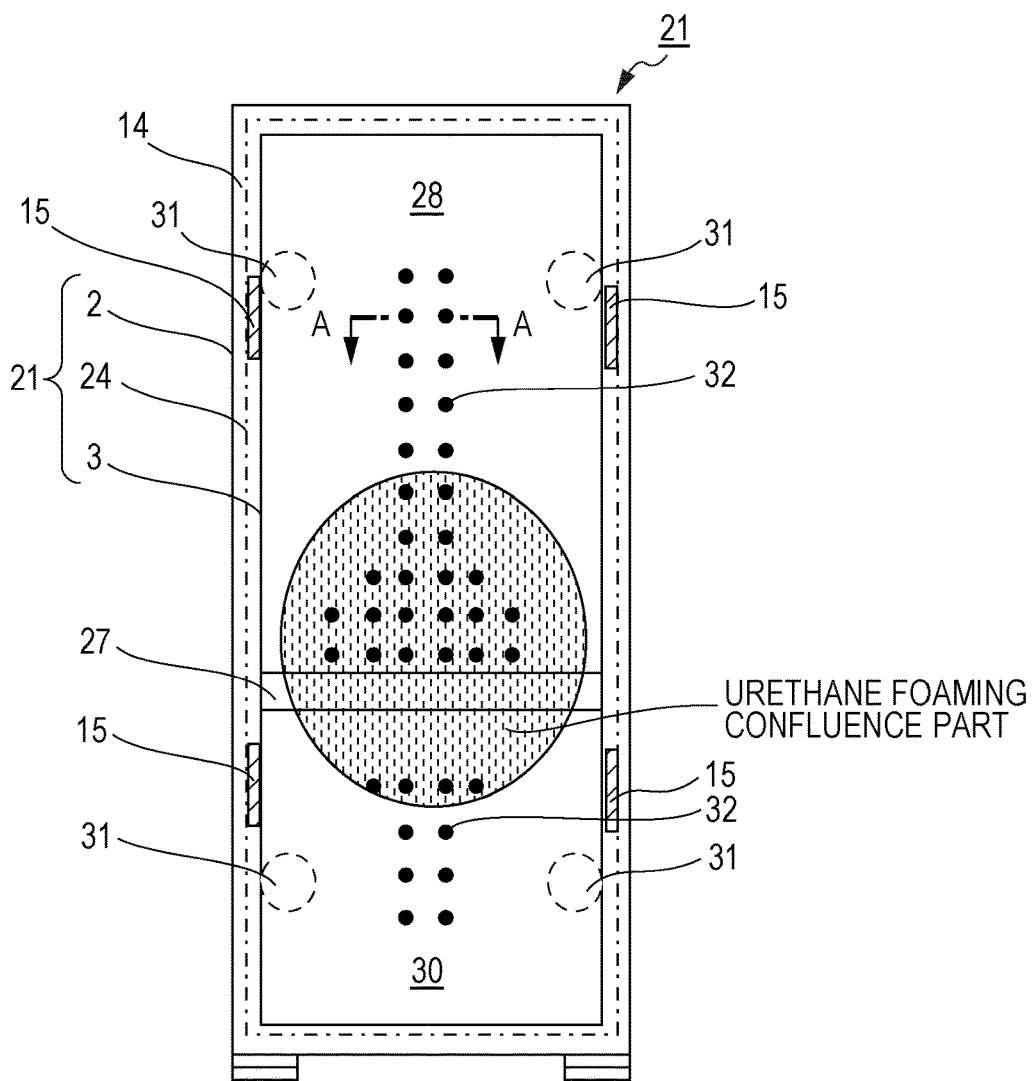
FIG. 4 is a front view of a heat insulating box of a refrigerator formed using a vacuum heat insulating body according to a second exemplary embodiment of the present invention.
Figure 5:
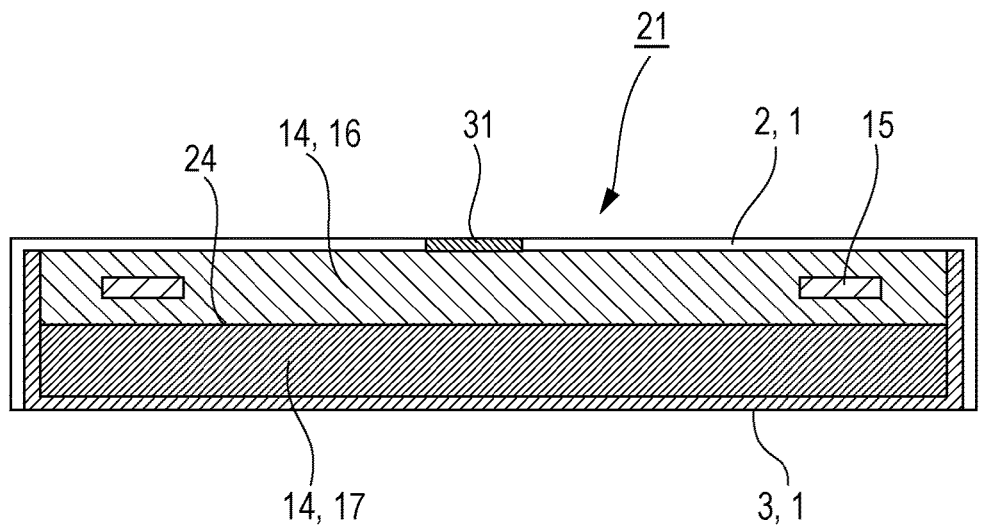
FIG. 5 is an enlarged cross-sectional view of a part of a wall of the heat insulating box according to the second exemplary embodiment of the present invention.

FIG. 4 is a front view of the heat insulating box of the refrigerator formed with the vacuum heat insulating body according to the second exemplary embodiment of the present invention. Further, FIG. 5 is an enlarged cross-sectional view of a part of a wall of the vacuum heat insulating box according to the second exemplary embodiment of the present invention. Note that, the same reference numeral is assigned to the part same as that of the first exemplary embodiment and the description thereof is therefore omitted, and only different parts will be described.

In FIG. 4 and FIG. 5, core material 14 and gas adsorption agent 15 are charged in heat insulating space 24 of heat insulating box 21 (hereinafter, referred to as vacuum heat insulating box) and vacuum sealed.

Similar to the first exemplary embodiment of the present invention, core material 14 is formed of two layers of the first heat insulating core material 16 which has heat conductivity greatly changing in accordance with temperature, and the second heat insulating core material 17 which has heat conductivity hardly changing in accordance with temperature. The first heat insulating core material 16 and the second heat insulating core material 17 are made of materials in which change gradients in the heat conductivity intersect with each other.

Vacuum heat insulating box 21 is manufactured by a method disclosed in Japanese Patent 5,310,928, and is briefly described. An enveloping member in which a fiber core material which forms second heat insulating core material 17 is disposed is set in heat insulating space 24 of vacuum heat insulating box 21 and then urethane liquid is injected from urethane liquid injection port 31 (see FIG. 4) provided at several appropriate parts on outer box 2 or inner box 3. Further, by foaming and hardening, the first heat insulating core material 16 and the second heat insulating core material 17 are filled. Next, the heat insulating space 24 is sealed by vacuum sealing via urethane liquid injection port 31 or by vacuum sealing the entirety of vacuum heat insulating box 21 after disposing the vacuum heat insulating box 21 in a vacuum chamber and sealing the vacuum sealing port such as urethane liquid injection port 31. Note that air vent holes 32 are dispersedly provided at appropriate parts on outer box 2 or inner box 3 in order to discharge air in heat insulating space 4 smoothly when the urethane liquid is injected, and air vent holes 32 are sealed similarly to urethane liquid injection port 31 after vacuum sealing.

In this configuration, core material 14 of vacuum heat insulating box 21 is disposed similarly to the present exemplary embodiment, such that the first heat insulating core material 16 faces the inner space side of the refrigerating chamber 28 or the like of vacuum heat insulating box 21 and the second heat insulating core material 17 faces the outer side.

The inner space of vacuum heat insulating box 21 is partitioned into refrigerating chamber 28 and freezing chamber 30 by partition plate 27 in the present embodiment, however the present invention is not limited thereto. The inner space may be partitioned into a plurality of storage chambers (refrigerating chamber, freezing chamber, ice-making chamber, vegetable chamber, or the like) having difference usages similar to the present exemplary embodiment.

Further, each of refrigerating chamber 28 and freezing chamber 30 has a door (not shown) and the door is configured according to vacuum heat insulating box 21.

In the configuration described above, vacuum heat insulating box 21 of the refrigerator shows an effect similar to vacuum heat insulating body 5 described in the present exemplary embodiment, and further a thickness of a wall of the refrigerator can be reduced.

That is, in vacuum heat insulating box 21, core material 14 has the two layer structure of the first heat insulating core material 16 made of the open cell resin and the second heat insulating core material 17 made of the fiber material such as glass wool, and therefore vacuum heat insulating box 21 has a configuration, in which a heat insulating layer formed of conventional hard polyurethane foam and a general vacuum heat insulating material, in which a core material is vacuum sealed in a laminated enveloping member including an aluminum deposited gas barrier layer are integrated. Further, since vacuum heat insulating box 21 itself has a high heat insulation property, this configuration eliminates the need for providing the heat insulating layer formed of the conventional hard polyurethane foam, and therefore a thickness of heat insulating space 4 which forms a heat insulating structural wall can be reduced and a capacity of vacuum heat insulating box 21 can be enlarged.

The open cell resin which forms first heat insulating core material 16 has small cells of, for example, 30 μm to 200 μm. Therefore, in general, when an inside of heat insulating space 4 is vacuum sealed, ventilation resistance (discharging resistance) of the open cell resin is large, and it takes time to reduce pressure of an inner space of the open cell resin.

However, in vacuum heat insulating box 21 according to the present exemplary embodiment, the first heat insulating core material 16 made of the open cell resin and the second heat insulating core material 17 made of the fiber material are charged in heat insulating space 4, and the thickness of the first heat insulating core material 16 is reduced by the thickness of the second heat insulating core material 17. Since the thickness of first heat insulating core material 16 is reduced, the length of the open cell passage in the open cell resin which forms first heat insulating core material 16 becomes shorter, and the ventilation resistance is reduced. Thus productivity can be improved by reducing time of vacuum sealing.

Further, in vacuum heat insulating box 21 according to the present exemplary embodiment, since the thickness of the first heat insulating core material 16 formed of the open cell resin having large ventilation resistance is reduced and thereby the length of the open cell passage is shortened, the gas gradually discharged from the inside of the open cell resin can be reduced, and at the same time, the gas is diffused to the whole passage formed of the open cells. Thus, the amount of the gas in the heat insulating box 21 is reduced, and deterioration of the heat insulating property can be suppressed. Further, since the gas is diffused, deformation due to partial increase in pressure can be suppressed.

Further, in vacuum heat insulating box 21, the reduction of mechanical strength due to reduction of the thickness of the first heat insulating core material 16, which is made of the open cell resin having the large ventilation resistance, is compensated by the second heat insulating core material 17 made of the fiber material such as glass wool or rock wool having a small ventilation resistance. Therefore, in addition to the deformation due to the increase in the inner pressure, deformation due to the lack of strength can also be prevented in this configuration.

Moreover, in glass wool, rock wool or the like which forms the second heat insulating core material 17, the heat conductivity thereof is small and the heat insulating property thereof is good, and therefore the heat insulating property of vacuum heat insulating box 21 can be excellent even when the thickness of the first heat insulating core material 16 is reduced. Further, in vacuum heat insulating box 21, since the amount of gas discharged from the heat insulating core material made of the open cell resin or the like having a large ventilation resistance becomes smaller, the deterioration of the heat insulating property can be also suppressed.

Furthermore, in vacuum heat insulating box 21, one of the heat insulating core materials is made of the open cell resin and the other heat insulating core material is made of the fiber material having ventilation resistance smaller than that of the heat insulating core material formed of the open cell resin. Thus, as described above, the vacuum sealing can be performed after injecting the open cell resin into heat insulating space 4 where the fiber material is disposed and integrally foaming. Therefore, the production cost can be reduced by greatly improving the productivity and vacuum heat insulating box 21 can be provided at a low price.

Third Exemplary Embodiment

In a third exemplary embodiment, a vacuum heat insulating body is used for a heat insulating structure of an LNG inboard tank of an LNG transporting tanker.

Figure 6:
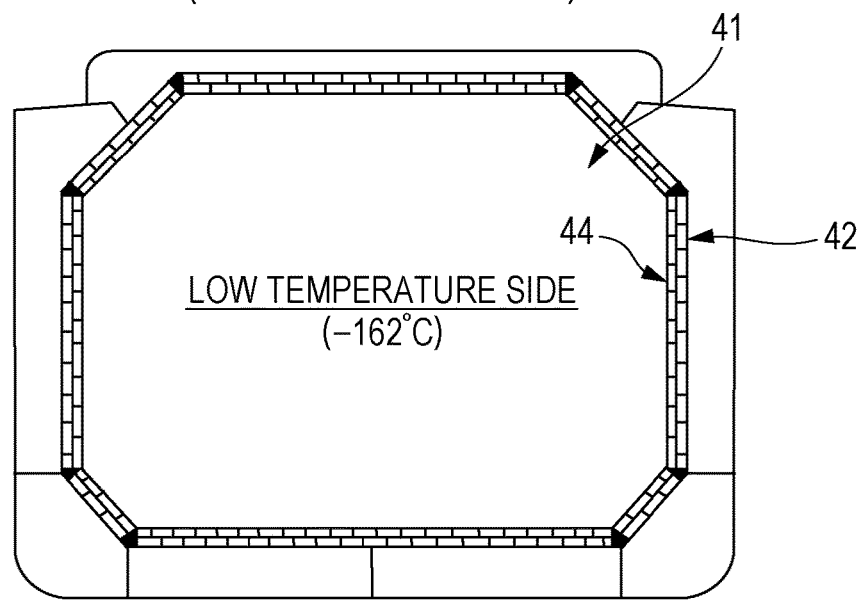
FIG. 6 is a cross-sectional view illustrating a schematic configuration of a membrane-type LNG transporting tanker having an inboard tank employing a vacuum heat insulating body according to a third exemplary embodiment of the present invention.
Figure 7:
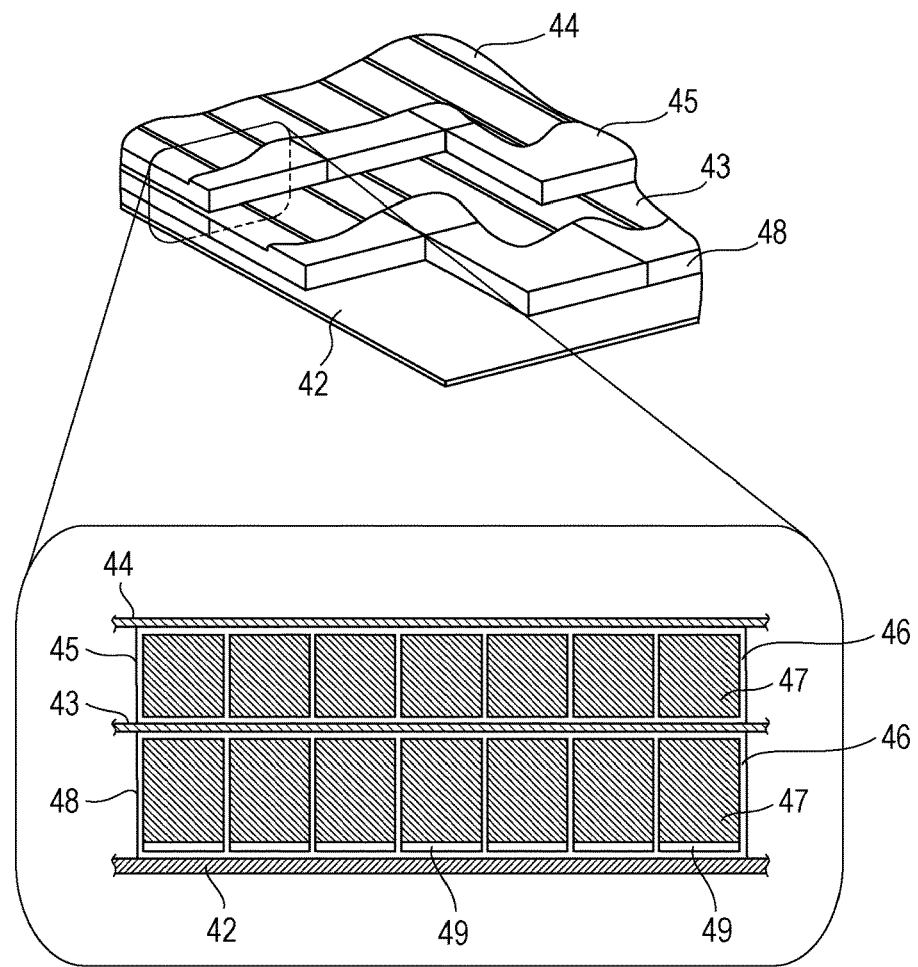
FIG. 7 is a schematic perspective view and a partially enlarged cross-sectional view of the schematic perspective view illustrating a two-layer structure of an inner surface of the inboard tank according to the third exemplary embodiment of the present invention.
Figure 8:
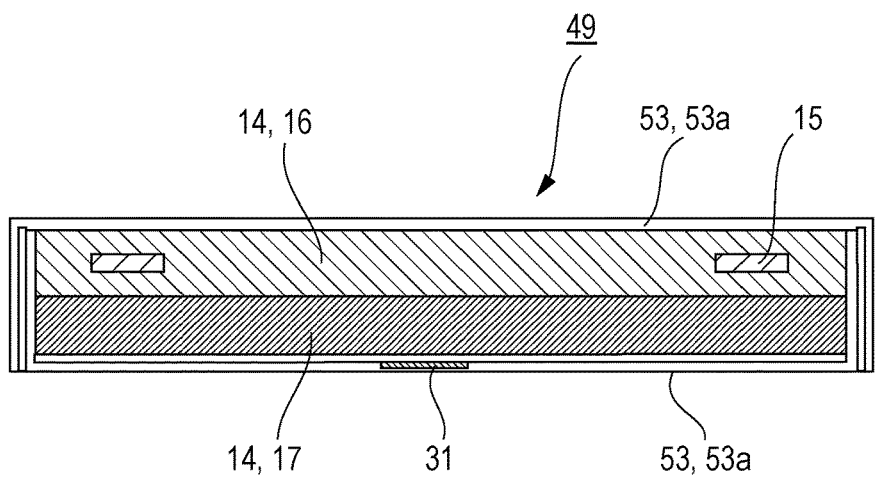
FIG. 8 is an enlarged cross-sectional view of the vacuum heat insulating body used in a heat insulating structure of the inboard tank according to the third exemplary embodiment of the present invention.

FIG. 6 is a cross-sectional view illustrating a schematic configuration of a membrane-type LNG transporting tanker having an inboard tank employing the vacuum heat insulating body according to the third exemplary embodiment. FIG. 7 is a schematic perspective view and a partially enlarged cross-sectional view thereof illustrating a two layer structure of an inner surface of the inboard tank according to the third exemplary embodiment. FIG. 8 is an enlarged cross-sectional view of the vacuum heat insulating body used in the heat insulating structure of the inboard tank according to the third exemplary embodiment.

As shown in FIGS. 6 to 8, heat insulating container 41 formed by a hull itself has a double inner and outer heat insulating structure having a primary heat protection and a secondary heat protection disposed inside the wall of the container which forms a tank.

In FIG. 7 and FIG. 8, heat insulating container 41 includes container outer tank 42, and container inner tank 44 provided inside container outer tank 42 with intermediate tank 43 therebetween. Each of container inner tank 44 and intermediate tank 43 is made of a stainless steel membrane or invar (nickel steel including 36% of nickel), and therefore a configuration having strong resistance against heat shrinking is provided.

The first heat insulating box 45 is a heat insulating structure disposed between container inner tank 44 and intermediate tank 43, and is defined by box frame body 46 having an opening at its one surface and made of wood such as plywood. Powdered heat insulating material 47 made of perlite or the like is filled in box frame body 46. The powdered heat insulating material 47 may be made of glass wool or the like instead of pearlite. The present exemplary embodiment will be explained by powdered heat insulating material 47 as an example.

Further, the second heat insulating box 48 disposed between the intermediate tank 43 and container outer tank 42 is formed by laying vacuum heat insulating body 49 on the bottom inner surface of the box frame body 46 made of wood and having an opening at its one surface in a configuration similar to the first heat insulating box 45. The second heat insulating box 48 is filled with powdered heat insulating material 47 such as pearlite from the opening side similarly to first heat insulating box 45. Further, in the present exemplary embodiment, second heat insulating box 48 has vacuum heat insulating body 49 disposed to face the outer wall, that is toward container outer tank 42.

In vacuum heat insulating body 49, similar to the first exemplary embodiment and the second exemplary embodiment, core material 14 is formed of two layers of the first heat insulating core material 16 having the heat conductivity greatly changing in accordance with temperature, and the second heat insulating core material 17 having the heat conductivity hardly changing. Change gradients in the heat conductivity of the first heat insulating core material 16 and the second heat insulating core material 17 intersect with each other, and detailed configurations thereof are similar to those in the first exemplary embodiment and the second exemplary embodiment. Further, enveloping member 53 is formed, similarly to that in the first exemplary embodiment, in a simple flat shape and formed of recessed metal thin plates 53a, 53a fitted with each other and welded at peripheral parts thereof. The recessed metal thin plate has an ionization tendency equal to or smaller than that of stainless and has high corrosion resistance.

Vacuum heat insulating body 49 according to the third exemplary embodiment achieves an effect similar to those of vacuum heat insulating body 5 and vacuum heat insulating box 21 described in the first exemplary embodiment and the second exemplary embodiment, and therefore description of the effect will not be repeated. However, in a case where vacuum heat insulating body 49 is used as a heat insulating material of the LNG inboard tank, the corrosion resistance of metal thin plates 53a, 53a forming the enveloping member which vacuum seals core material 14 is extremely high compared to a configuration with a conventional laminated sheet enveloping member having a general aluminum deposited layer. Thus, for example, even if vacuum heat insulating body 49 is exposed to seawater, tearing or breaking due to corrosion can be prevented, and therefore is high in reliability.

Further, since core material 14 has the two layer structure of the first heat insulating core material 16 formed of the open cell resin and the second heat insulating core material 17 formed of the fiber material such as glass wool, heat insulating property of core material 14 is excellent. Thus, a thickness of second heat insulating box 48 which uses vacuum heat insulating body 49 can be reduced by decreasing the amount of powdered heat insulating material 47 and the capacity of the heat insulating container can be enlarged.

Further, in the vacuum heat insulating body 49 used as the heat insulating material of the LNG inboard tank, the first heat insulating core material 16 is disposed at a side to face the inner space of container inner tank 44 or the inner space in which a substance such as LNG is stored. Thus heat insulating container 41 can be efficiently insulated from heat, and its heat insulating property can be made high. That is, with the above configuration, as described above, the first heat insulating core material 16 having low heat conductivity $\lambda$ efficiently insulates heat at a low temperature of the inner space, and then the second heat insulating core material 17 located outside of the first heat insulating core material 16 insulates heat at a low temperature range yet having a relatively higher temperature after the first heat insulating core material 16 having low heat conductivity $\lambda$ strongly insulates heat. With this configuration, the second heat insulating core material 17 having slightly higher heat conductivity $\lambda$ can strongly insulate heat, and therefore an ultra-low temperature substance in the container can be insulated from heat and kept efficiently by taking advantage of heat insulating property of each insulating material. In particular, it is effective because the substance such as LNG stored in heat insulating container 41 has an ultra-low temperature of −162° C.

Further, since the ZSM-5 zeolite used as gas adsorption agent 15 has a chemical adsorption property and gas adsorbed by the ZSM-5 type zeolite is hardly released, the degree of vacuum inside the vacuum heat insulating body 49 can be favorably maintained. Thus, when flammable fuel or the like such as LNG is handled, even if the gas adsorption agent adsorbs flammable gas for some reason, the gas is not released again by the influence of increase in temperature or the like thereafter. Therefore, the safety of vacuum heat insulating body 49 is ensured by enhancing a combustion preventing property of vacuum heat insulating body 49.

Fourth Exemplary Embodiment

Figure 9:
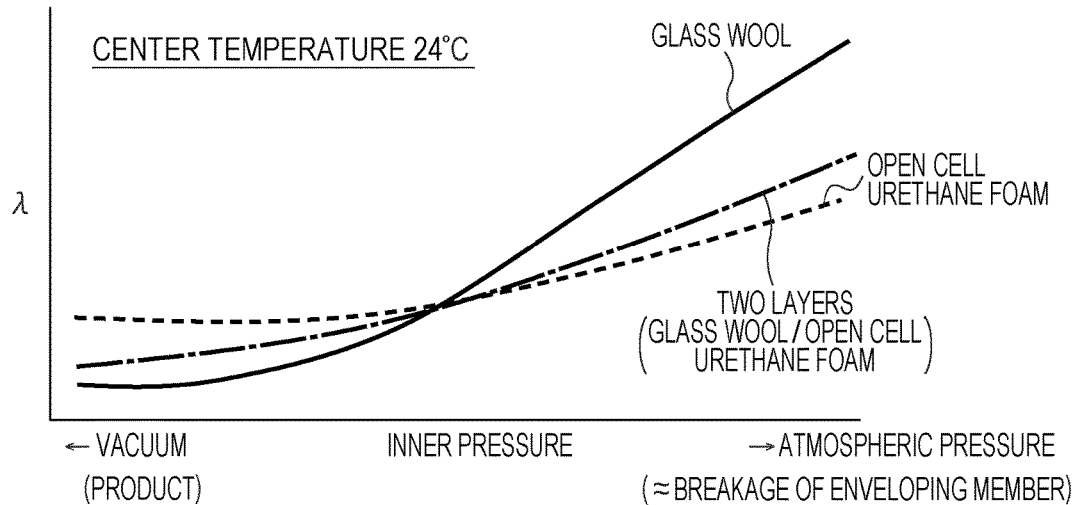
FIG. 9 is a graph illustrating a relationship between pressure applied to a core material and heat conductivity of a vacuum heat insulating body according to another exemplary embodiment of the present invention.

FIG. 9 shows a relationship between inner pressure and heat conductivity $\lambda$ of open cell urethane foam and glass wool at a center temperature of 24° C. As shown in FIG. 9, heat conductivity $\lambda$ of a single layer of the open cell urethane foam is hardly changed when the pressure is changed, whereas heat conductivity $\lambda$ of a single layer of the glass wool is greatly changed in accordance with the pressure, and therefore change gradients in the heat conductivity of the open cell urethane foam and the glass wool are different from each other. Further, since heat conductivity $\lambda$ of the open cell urethane foam maintains low at or around the atmospheric pressure, the heat insulating property is maintained to some extent at atmospheric pressure.

In the vacuum heat insulating body according to the present exemplary embodiment, two materials are used for the heat insulating core materials of the vacuum heat insulating body. That is, an air permeable core material is vacuum sealed in an enveloping member and the core material is formed of at least two layers of the heat insulating core materials having different heat conductivities. Further, in at least two of the at least two layers of the heat insulating core materials which form the core material, the change gradient in the heat conductivity changes in accordance with pressure, and the relative conductivities of the two heat insulating core materials are switched in the atmospheric pressure and in a vacuum state.

With this configuration, since one of the heat insulating core materials is formed of the open cell urethane foam which keeps low heat conductivity $\lambda$ at atmospheric pressure even if the enveloping member is broken and the vacuum heat insulating body is exposed to or near the atmospheric pressure, the heat insulating property can be maintained.

Here, in FIG. 9, the open cell urethane foam is used as the material in which heat conductivity $\lambda$ is hardly changed when the pressure is changed, and the glass wool is used as the material in which heat conductivity $\lambda$ is greatly changed in accordance with the pressure. As combinations other than this, styrene fiber and glass wool, cellulose fiber and silica powder, and cellulose fiber and glass wool may be adopted.

Fifth Exemplary Embodiment

In FIG. 2, FIG. 4, and FIG. 5, the gas adsorption agent is disposed at the side of the heat insulating core material formed of the open cell resin and vacuum sealed together with the core material. In the present exemplary 10 embodiment, a drying agent or a gas adsorption agent is disposed at a side of the heat insulating core material in which the degree of vacuum is hardly decreased by vacuum sealing, in other words, at a side of the heat insulating core material in which a number of exhausting passages is small.

By disposing one or both of the drying agent and the gas adsorption agent, for example, on the side that the organic foam material in which sufficient vacuum sealing is difficult is disposed, inner pressure of the vacuum heat insulating material can be reduced and the heat insulating property can be improved without extending the time of a vacuum sealing process.

Other Exemplary Embodiments

As described above, the vacuum heat insulating body of the present invention has a high heat insulating property, and therefore the thickness of the heat insulating structure employing the vacuum heat insulating body can be reduced. However, the invention is not limited to the disclosed exemplary embodiments, and various changes can be made within the scope to achieve the effect of the present disclosure.

For example, in each of the exemplary embodiments described above, vacuum heat insulating box 21 of the refrigerator or vacuum heat insulating body 49 of the heat insulating container for the LNG inboard tank have been described as examples, however the configuration and a shape of the vacuum heat insulating body and the vacuum heat structure employing the vacuum heat insulating body are not limited thereto. That is, the heat insulating structure may be formed as a heat insulating wall or the like such as a door in a substantially flat plate shape, instead of a container-like shape. Further, the heat insulating structure may be a container other than the LNG inboard tank, for example, a housing of a portable refrigerator, a housing of a thermostat tank, a housing of a hot water storage tank or the like.

Further, in all of the exemplary embodiments, the open cell urethane foam is used as the open cell resin, however the open cell resin is not limited thereto, and for example, copolymer resin including open cell phenolic foam or one or both of the open cell urethane foam and the open cell phenolic foam may be used. Further, it is effective if the open cell resin is formed such that cells are formed in a skin layer in addition to the core layer as described in Japanese Patent No. 5,310,928; however the open cell resin may be obtained by removing the skin layer and isolating the core layer from the general open cell resin in which the skin layer does not have open cells. Similarly, although the inorganic fiber material such as glass wool is described as an example of the heat insulating material having the ventilation resistance smaller than that of the open cell resin, well-known organic fiber material other than the inorganic fiber material may be used, and powder material such as pearlite may be used.

Figure 10:
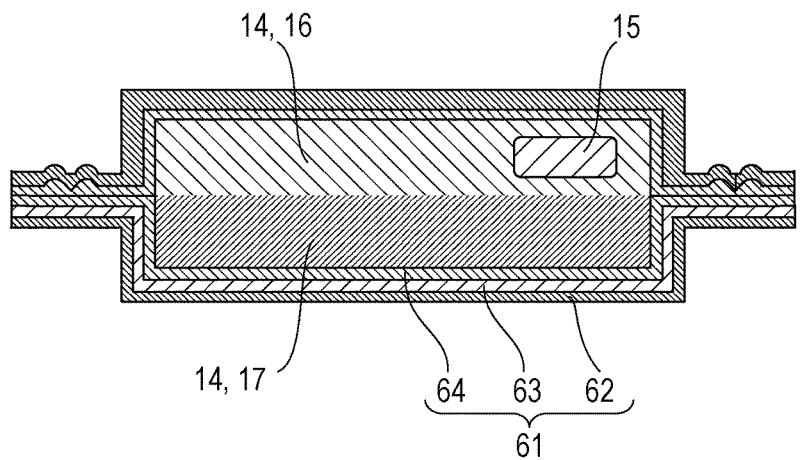
FIG. 10 is an enlarged cross-sectional view of the vacuum heat insulating body according to another exemplary embodiment of the present invention.

Further, the enveloping member of the vacuum heat insulating body may be, for example, laminated sheet 61 which is conventionally used, as shown in FIG. 10. Laminated sheet 61 is formed by integrally laminating surface protection layer 62 made of nylon film, polyethylene terephthalate film, polypropylene film, or the like, gas barrier layer 63 made of metal foil such as aluminum foil, copper foil, or stainless foil, deposition film in which metal or metal oxide is deposited onto resin film as base material, and film in which well-known coating treatment is applied to a surface of the deposition film, and heat welding layer 64 made of thermoplastic resin or the like such as low density polyethylene.

In this way, various modification and other embodiments are apparent to those in the art from the description of each of the exemplary embodiments. Accordingly, the description of each of the exemplary embodiments should be merely understood as one of examples, and therefore the description of each of the exemplary embodiments is provided to teach the best mode to carry out the present invention to those in the art. A detailed structure and/or a function can be substantially changed within a scope of the present invention.

As described above, in the present invention, the vacuum heat insulating body is formed by vacuum sealing an air permeable core material in an enveloping member, and the core material is formed of at least two layers of the heat insulating core materials having different heat conductivities. Further, at least two of the at least two layers of the heat insulating core materials which form the core material are formed of materials having change gradients in the heat conductivity changed in accordance with temperature, and the change gradients in the heat conductivity of the heat insulating core materials intersect with each other.

With this, the vacuum heat insulating body has two layers of the heat insulating core materials having different heat conductivities in a vacuum state, and the heat insulating property becomes higher in a wide temperature range compared to a conventional configuration in which a single layer of the heat insulating core material made of fiber material such as glass wool or rock wool is vacuum sealed, and therefore the high heat insulating property can be obtained even in an ultra-low temperature range. Thus, the vacuum heat insulating material capable of insulating heat efficiently in the wide temperature range from a refrigerator to a heat insulating container which holds an ultra-low temperature substance such as LNG or hydrogen gas can be provided. Further, a thickness of a wall of a heat insulating structure formed by employing the vacuum heat insulating body can be reduced because the heat insulating property is improved.

Further, in the present invention, the vacuum heat insulating body is formed by vacuum sealing the air permeable core material in the enveloping member, and the core material is made of at least two layers of the heat insulating core materials having different heat conductivities. Further, in at least two of the at least two layers of the heat insulating core materials which form the core material, change gradient in the heat conductivity is changed in accordance with pressure, and the relative conductivities of the two heat insulating materials are switched in the atmospheric pressure and in the vacuum state.

With this, even if the enveloping member is broken for some reason, since the heat insulating core material having the heat conductivity lower than that of the other heat insulating core material under atmospheric pressure is provided, the heat insulating property can be maintained to some extent. Thus, when the vacuum heat insulating body is used for a refrigerator, sudden deterioration of the heat insulating property due to the breakage of the enveloping member can be avoided, and therefore not all of food in the refrigerating chamber are spoiled.

Further, in the present invention, one of the heat insulating core materials which form the core material is made of the organic heat insulating material, and the other heat insulating material is made of the inorganic heat insulating material.

With this, the heat insulating property becomes high in a wide temperature range, and the vacuum heat insulating body having various usage can be provided.

Further, in the present invention, one of the heat insulating materials which form the core material is made of the open cell resin, and the other heat insulating material is made of the fiber material such as glass wool or rock wool or the powder material such as pearlite.

With this, the heat insulating property becomes high in a wide temperature range, and the vacuum heat insulating body having various usage can be provided.

Further, in the present invention, the fiber material or the powder material of the heat insulating core material which forms the core material is charged in an air permeable bag.

With this, the fiber material or the powder material, which is flexible and loses its shape easily, can be charged in the enveloping member easily, and therefore productivity is improved and the production cost can be reduced.

Further, in the present invention, the gas adsorption agent is vacuum sealed in the enveloping member together with the core material, and the gas adsorption agent is disposed at a side of the heat insulating core material made of the open cell resin in the enveloping member.

With this, when gas remaining in the enveloping member is adsorbed, the gas remaining in the open cells of the open cell resin after vacuum sealing can be adsorbed efficiently by the gas adsorption agent, and therefore deformation of the heat insulating body due to increase in inner pressure caused by lack of the gas adsorption effect or deterioration of the heat insulating property can be prevented.

Further, in the present invention, the drying agent is vacuum sealed in the enveloping member together with the core material, and the drying agent is disposed in the enveloping member, on the side that the heat insulating core material in which the number of the exhausting passage is small is disposed.

With this, when gas remaining in the enveloping member is adsorbed, moisture remaining in the open cells of the heat insulating core material having a small number of exhausting passages can be adsorbed efficiently by the drying agent, and therefore deformation of the heat insulating body due to increase in inner pressure caused by lack of moisture adsorption or deterioration of the heat insulating property can be prevented.

Further, in the present invention, the gas adsorption agent is vacuum sealed in the enveloping member together with the core material, and the gas adsorption agent is disposed in the enveloping member, on the side of the heat insulating core material in which the number of the exhausting passage is small.

With this, when gas remaining in the enveloping member is adsorbed, the gas remaining in the open cells of the heat insulating core material having a small number of exhausting passages can be adsorbed efficiently by the gas adsorption agent, and therefore deformation of the heat insulating body due to increase in inner pressure caused by lack of gas adsorption or deterioration of the heat insulating property can be prevented.

Further, in the present invention, the enveloping member is formed of the metal thin plates, and outer peripheral parts of the metal thin plates are fixed to each other and the inside thereof is vacuum sealed.

With this, in the enveloping member made of a metal thin plate vacuum sealing the core material, the corrosion resistance is extremely high compared to a multi-layer enveloping member including an aluminum deposited layer of a conventional general vacuum heat insulating plate. Thus, even if it is used for the LNG tanker or the like and exposed to seawater, tearing or breaking due to corrosion can be prevented, and therefore durability can be maintained at a higher level for a long period of time.

Further, in the present invention, a heat insulating container which holds a substance having a temperature at least 100° C. lower than a normal temperature is provided, and the heat insulating core material having lower heat conductivity at 100° C. lower than the normal temperature is disposed at a lower temperature side in the heat insulating container. Here, the normal temperature means the atmospheric temperature.

With this, the ultra-low temperature substance in the container can be insulated from heat and stored efficiently by taking advantage of the characteristics of each of the two layers of the heat insulating core materials.

Further, the heat insulating wall of the present invention can be used at a temperature equal to or lower than 0° C., and the heat insulating core material having lower heat conductivity is disposed on the side configured to be used facing the lower temperature side of the heat insulating wall.

With this, heat insulation at both sides of the heat insulating wall can be efficiently performed by taking advantage of the characteristics of the two layered heat insulating core materials.

Further, the highest heat insulating effect can be obtained by covering the entire wall of the space insulated from heat with the vacuum heat insulating body rather than a configuration in which a part of the wall is covered with the vacuum heat insulating body. Specifically, for example, the present invention may be applied to a freezing container without a window, a backyard of a convenience store in which illuminance is ensured by using a lighting device, a freezing storage, or the like.

INDUSTRIAL APPLICABILITY

As described above, the present invention can provide a vacuum heat insulating body having high heat insulating property, and the vacuum heat insulating body capable of reducing the thickness of the heat insulating structure formed by employing the heat insulating body. And the present invention can be widely applied to the consumer appliance such as the refrigerator, the industrial vacuum heat insulating body such as the freezing container carried by trains, vessels, or vehicles, the backyard of the convenience store, the freezing storage, or the LNG storage tank, and the heat insulating container, or the heat insulating wall employing the vacuum heat insulating body.

REFERENCE MARKS IN THE DRAWINGS

1: heat insulating box
2: outer box
3: inner box
4, 24: heat insulating space
5, 49: vacuum heat insulating body
6: heat insulating foam
7, 27: partition plate
8, 28: refrigerating chamber
9: upper freezing chamber
10: ice-making chamber
11: lower freezing chamber
12: vegetable chamber
13, 53: enveloping member
14: core material
15: gas adsorption agent
16: first heat insulating core material
17: second heat insulating core material
21: vacuum heat insulating box
25: partition plate
30: freezing chamber
31: urethane liquid injection port
32: air vent hole
41: heat insulating container
42: container outer tank
43: intermediate tank
44: container inner tank
45: first heat insulating box
46: box frame body
47: powdered heat insulating material
48: second heat insulating box
53a, 53b: metal thin plate
61: laminated sheet
62: surface protection layer
63: gas barrier layer
64: heat welding layer

The invention claimed is:

1. A vacuum heat insulating body comprising:
   a core material having air permeability; and
   an enveloping member which vacuum seals the core material,
   wherein the core material is formed of at least two layers of heat insulating core materials having different heat conductivities,
   at least two of the at least two layers of the heat insulating core materials are formed of materials having different change gradients in the heat conductivity as a function of temperature from each other, and
   superimposed plots of the change gradients of the core materials of the at least two layers intersect.

2. The vacuum heat insulating body according to claim 1, wherein one of the at least two layers of the heat insulating core materials is formed of an organic heat insulating material, and another of the at least two layers of the heat insulating core materials is formed of an inorganic heat insulating material.

3. The vacuum heat insulating body according to claim 1, wherein one of the at least two layers of the heat insulating core materials is formed of open cell resin, and another of the at least two layers of the heat insulating core materials is formed of fiber material or powder material.

4. The vacuum heat insulating body according to claim 3, wherein the heat insulating core material formed of the fiber material or the powder material is charged in a bag having air permeability.

5. The vacuum heat insulating body according to claim 3, wherein a gas adsorption material is vacuum sealed in the enveloping member together with the core material, and the gas adsorption material is disposed in the enveloping member, on the heat insulating core material formed of the open cell resin side.

6. The vacuum heat insulating body according to claim 3, wherein the layer of the open cell resin has a structure that is more difficult to evacuate by vacuum sealing than that of the another of the at least two layers, and a drying agent is vacuum sealed in the enveloping member together with the core material, and the drying agent is disposed in the enveloping member, in the layer of the open cell resin.

7. The vacuum heat insulating body according to claim 3, wherein the layer of the open cell resin has a structure that is more difficult to evacuate by vacuum sealing than that of the another of the at least two layers, and a gas adsorption agent is vacuum sealed in the enveloping member together with the core material, and the gas adsorption agent is disposed in the enveloping member, in the layer of the open cell resin.

8. The vacuum heat insulating body according to claim 1, wherein the enveloping member is formed of metal plates, and outer peripheral parts of the metal plates are fixed to each other and an enclosure formed by the metal plates is vacuum sealed.

9. A heat insulating container comprising the vacuum heat insulating body according to claim 1, the heat insulating container holding a substance at a temperature lower than a normal temperature by at least 100° C., wherein the vacuum heat insulating body is formed such that the heat insulating core material having lower heat conductivity at a temperature lower than the normal temperature by at least 100° C., out of the at least two layers of the heat insulating core materials, is disposed at a side facing an inner space of the heat insulating container, wherein the normal temperature is defined by the definition of National Institute of Standards and Technology.

10. A heat insulating wall comprising the vacuum heat insulating body according to claim 1, the heat insulating wall designed to be used at a first temperature equal to or below 0° C., wherein the heat insulating core material having lower heat conductivity out of the at least two layers of the heat insulating core materials is disposed in the heat insulating body on a side that is configured to hold materials to be held at a second temperature equal to or below 0° C., wherein the second temperature is lower than the first temperature.

11. A vacuum heat insulating body comprising:
a core material having air permeability; and
an enveloping member which vacuum seals the core material,
wherein the core material is formed of at least two layers of heat insulating core materials having different heat conductivities,
at least two of the at least two layers of the heat insulating core materials are formed of materials having different heat conductivities in accordance with air pressure, and
a heat conductivity of a heat insulating material of one layer out of the at least two layers is larger than that of the other of the at least two layers in a vacuum state, and the heat conductivity of the heat insulating material of another layer of the at least two layers is larger than that of the one layer in an atmospheric pressure.

12. The vacuum heat insulating body according to claim 11, wherein one of the at least two layers of the heat insulating core materials is formed of an organic heat insulating material, and another of the at least two layers of the heat insulating core materials is formed of an inorganic heat insulating material.

13. The vacuum heat insulating body according to claim 11, wherein one of the at least two layers of the heat insulating core materials is formed of open cell resin, and another of the at least two layers of the heat insulating core materials is formed of fiber material or powder material.

14. The vacuum heat insulating body according to claim 11, wherein the enveloping member is formed of metal plates, and outer peripheral parts of the metal plates are fixed to each other and an enclosure formed by the metal plates is vacuum sealed.

15. The vacuum heat insulating body according to claim 13, wherein the heat insulating core material formed of the fiber material or the powder material is charged in a bag having air permeability.

* * * * *